Figure 1:
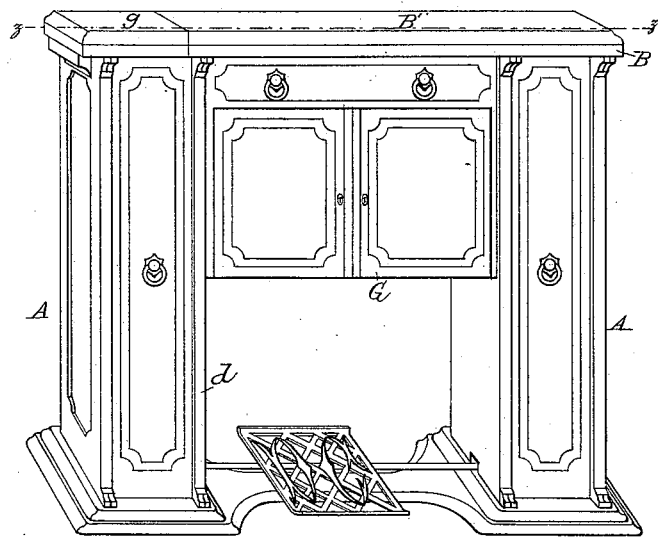

(No Model.) 5 Sheets—Sheet 1.

W. C. DONN & W. M. CUTHBERT.
SEWING MACHINE TABLE.

No. 428,382. Patented May 20, 1890.

(No Model.) 5 Sheets—Sheet 2.

W. C. DONN & W. M. CUTHBERT.
SEWING MACHINE TABLE.

No. 428,382. Patented May 20, 1890.

Fig. 5ª.

Witnesses:
M. B. Dodge
Julius Richwolt

Inventors,
W. C. Donn,
W. M. Cuthbert,
By W. C. Donn
Attorney.

(No Model.) 5 Sheets—Sheet 3.

W. C. DONN & W. M. CUTHBERT.
SEWING MACHINE TABLE.

No. 428,382. Patented May 20, 1890.

Witnesses:
M. R. Dodge
Julius Rehworst

Inventors,
W. C. Donn,
W. M. Cuthbert.
By W. C. Donn
Attorney.

(No Model.) 5 Sheets—Sheet 4.

W. C. DONN & W. M. CUTHBERT.
SEWING MACHINE TABLE.

No. 428,382. Patented May 20, 1890.

Fig. 14ª

Witnesses:
N. B. Dodge
Julius Rehwoldt

Inventors,
W. C. Donn,
W. M. Cuthbert
By W. C. Donn
Attorney.

THE NORRIS PETERS CO., PHOTO-LITHO., WASHINGTON, D. C.

(No Model.)  5 Sheets—Sheet 5.

W. C. DONN & W. M. CUTHBERT.
SEWING MACHINE TABLE.

No. 428,382. Patented May 20, 1890.

Witnesses:
A. B. Dodge
Julius Rehwoldt

Inventors,
W. C. Donn
W. M. Cuthbert
By W. C. Donn
Attorney.

UNITED STATES PATENT OFFICE.

WILTON C. DONN, OF BROOKLYN, AND WILLIAM M. CUTHBERT, OF NEW YORK, N. Y.

SEWING-MACHINE TABLE.

SPECIFICATION forming part of Letters Patent No. 428,382, dated May 20, 1890.

Application filed September 24, 1885. Serial No. 178,086. (No model.)

*To all whom it may concern:*

Be it known that we, WILTON C. DONN, of Brooklyn, in the county of Kings and State of New York, and WILLIAM M. CUTHBERT, of New York, in the county and State of New York, citizens of the United States, have invented a new and useful Sewing-Machine Table, of which the following is a specification.

Our invention relates to sewing-machine tables, stands, or cabinets of that class wherein the sewing-machine can be lowered below or under the table-top for the purpose of concealment and as a protection against careless handling, dust, &c., and the top of the table, stand, or cabinet can be constructed so as to have a flat surface, like an ordinary table.

In order that the modern sewing-machine may be dropped or lowered below the table-top, it is necessary that the machine be moved away from the driving-wheel, so that the hand-wheel and platform shall be moved out of line with the driving-wheel and avoid the said wheel when the machine is lowered. This principle is shown and claimed in Letters Patent of the United States No. 324,753, granted to William M. Cuthbert August 18, 1885, for sewing-machine tables. In the construction described in the specification of that patent the machine is raised and lowered by hand, and also moved toward and from the line of the driving-wheel in the same manner, and to set the machine for working a number of pieces have to be separately moved and adjusted, and previous to lowering the machine the same pieces have to be displaced, several movements being required to get the machine in position for working or to lower it and arrange the top.

The object of the present invention is, first, to construct a sewing-machine table in such a manner that the machine can be raised into its operative position above the table-top and lowered out of the same by means of a hinged cover, a movable platform, and mechanism connecting the said cover with said platform, the connecting mechanism being arranged and adjusted to allow the cover to turn from its position as a cover to that of an extension of the table-top, where it serves also as a leaf for the table, by compensating for the difference between the distance traversed by the cover and that moved by the machine; second, to so connect the compensating mechanism by which the hinged cover is caused to raise and lower the machine with the movable platform as to leave the surface of the platform of the machine clear of the connecting mechanism when the machine is raised to its operative position; third, to so arrange the mechanism by which the hinged cover is caused to raise and lower the machine that when operated by the turning of the cover the lifting action is applied to the platform in the direction of its motion, in order to avoid straining or crowding the platform against the walls of the inclosure in which it moves or its guides against their guideways, with the resulting liability of making the machine hard to raise or of displacing the platform; fourth, to raise the machine by applying the power and motion derived through the connecting mechanism from the hinged cover acting as a lever to the under side of the machine-platform, so that it is moved from underneath, and thereby relieved of the direct strain of the mechanism by which the force of the lever is transmitted; fifth, to raise and lower the machine by mechanism operated by a hinged table-cover acting as a lever without connecting the platform of the machine with the table-top or directly with the lifting mechanism, and thereby avoid drawing the machine and its platform or base in the direction of the movement of the cover, whereby liability of displacing the machine is obviated; sixth, to guard against the displacement of the machine and its platform while being raised and lowered, and to steady its motion by means of fixed guides and guideways that hold the machine-platform level and cause the machine to move steadily and with certainty into and out of its operative position and into and out of its receptacle; seventh, to ease the movements of the machine-platform and prevent it from catching in the walls of the inclosure by means of rollers pivoted in a frame under or below the ends of the platform, so as to bear against the walls of the inclosure, but not enter the recess in the top with said platform; eighth, to move the machine by means of a hinged cover acting as a lever through suitable connecting mechanism from a position above the table-top, where its band-wheel aligns with the driving-wheel, to a position under the table-top, with its band-wheel to one side of the driving-wheel, and to return the machine by the same means; ninth, to construct a sewing-machine table in which the sewing-machine and its platform shall be movable into and out of its recess in the table-top by moving it downward and upward between the driving-wheel and the end of the recess most distant from the driving-wheel by means of a hinged cover and mechanism connecting the said cover with the platform; tenth, to construct a sewing-machine table in such a manner that the machine supported on a suitable platform shall be movable in the recess in the table-top away from the driving-wheel and downward out of said recess between the driving-wheel and the end of the recess most distant therefrom by means of a hinged cover and suitable mechanism that communicate the motion of said cover, when opened, to the platform on which the machine is supported, the construction also being such that when the cover is open the machine is caused to move upward and toward the driving-wheel; eleventh, to convert the table-top into a writing-desk; also, to furnish a firm support for the cover when opened to form an extension-leaf.

Figure 2:
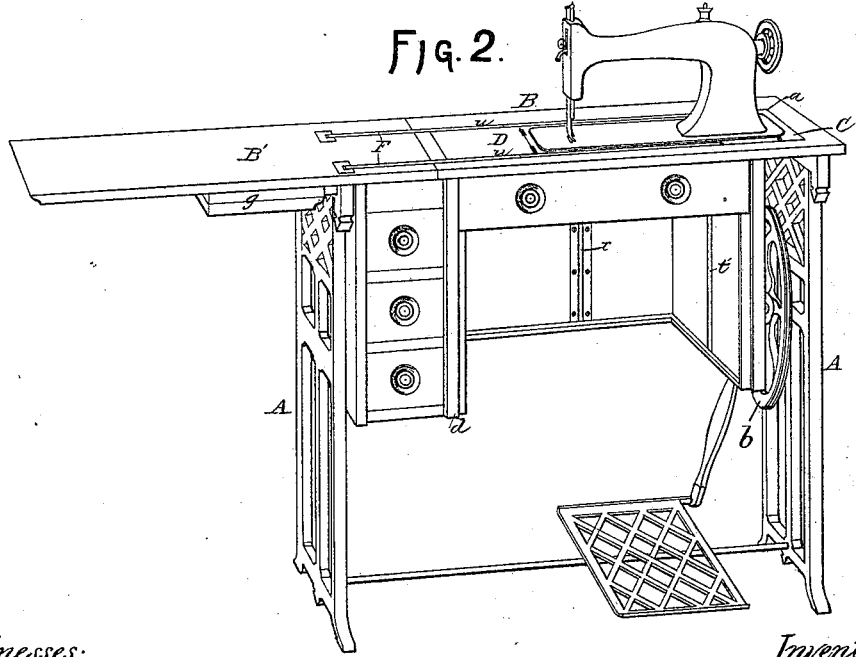
Figure 3:
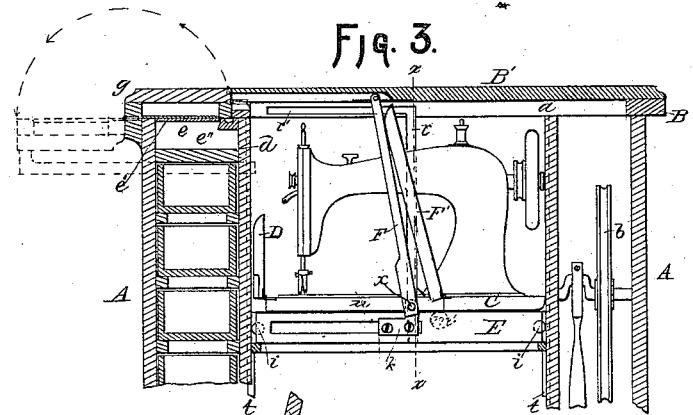
Figure 4:
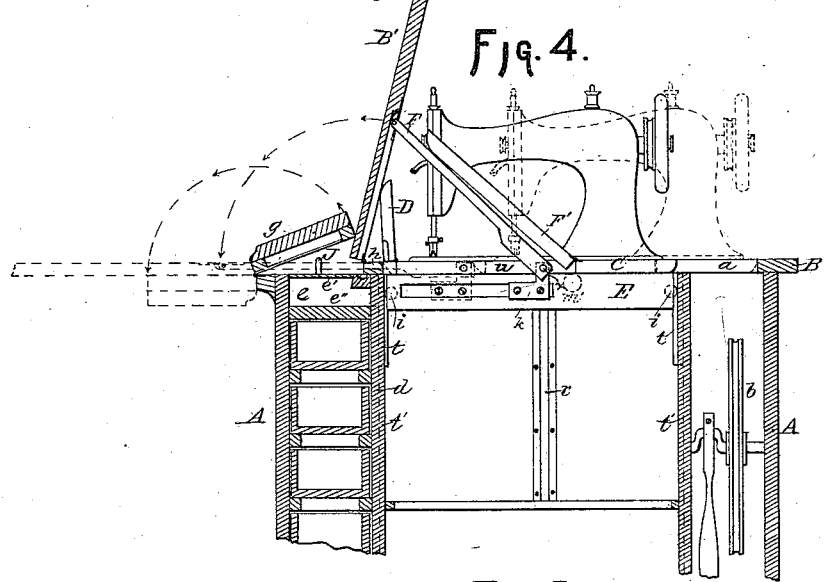
Figure 5:
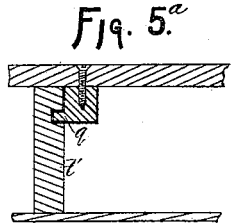
Figure 5:
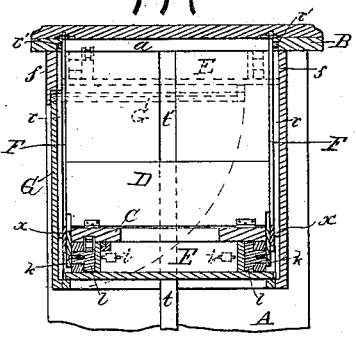
Figure 6:
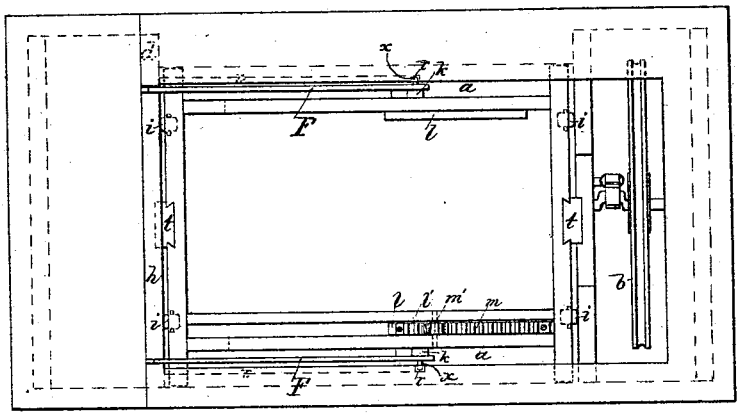
Figure 8:
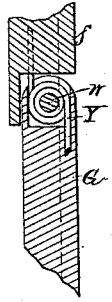
Figure 7:
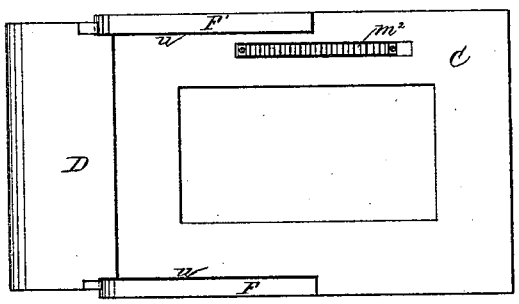
Figure 9:
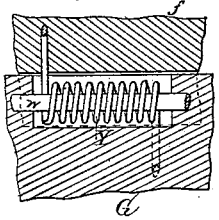
Figure 10:
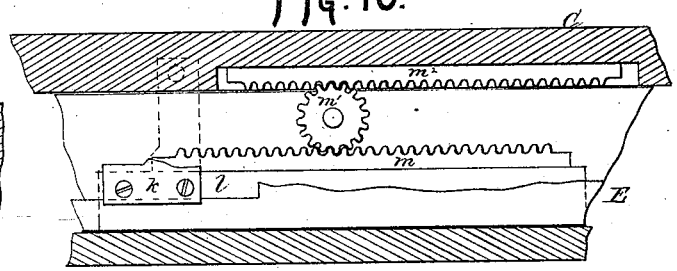
Figure 11:
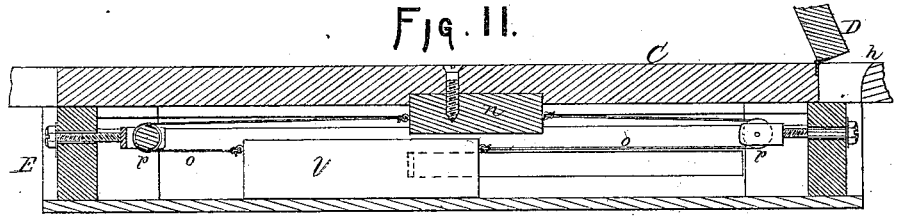
Figure 12:
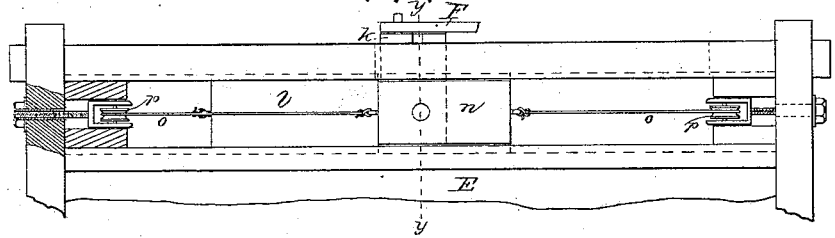
Figure 13:
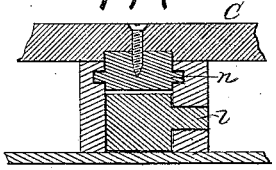
Figure 14:
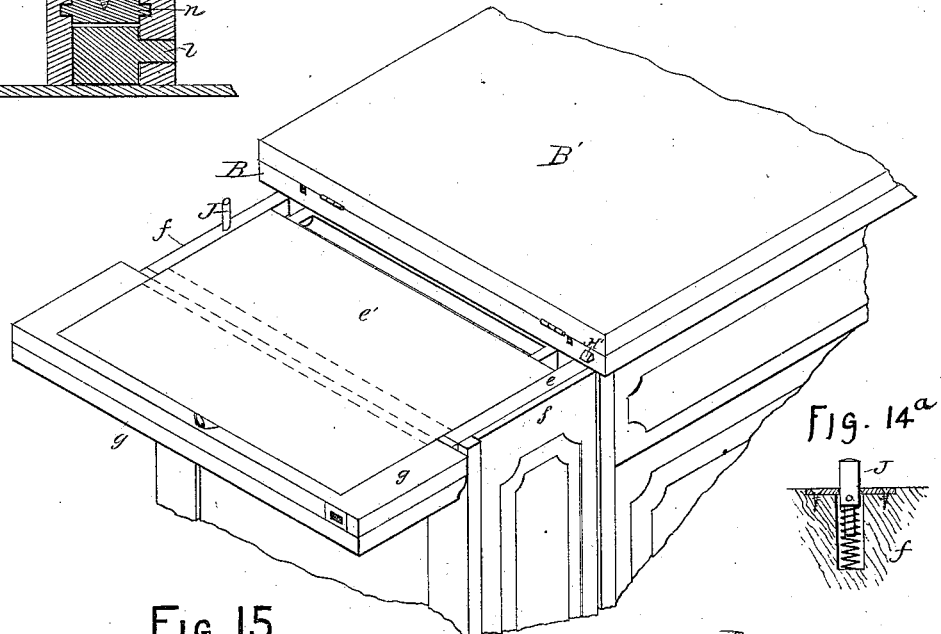
Figure 15:
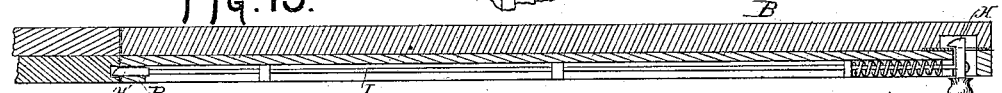
Figure 16:
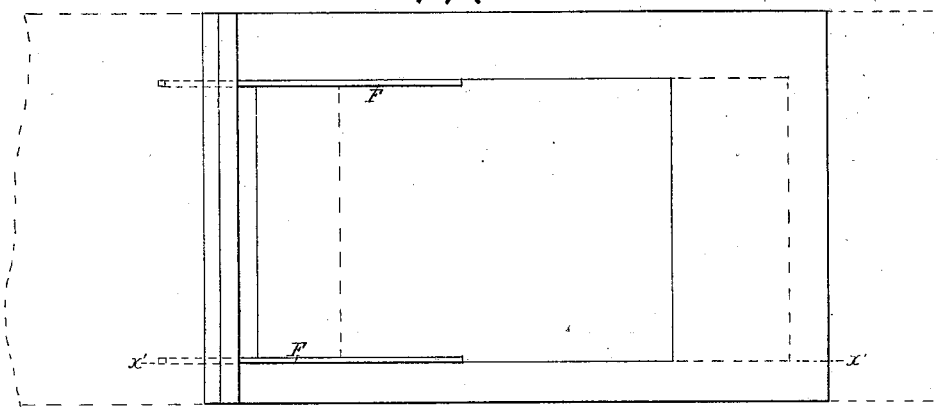
Figure 17:
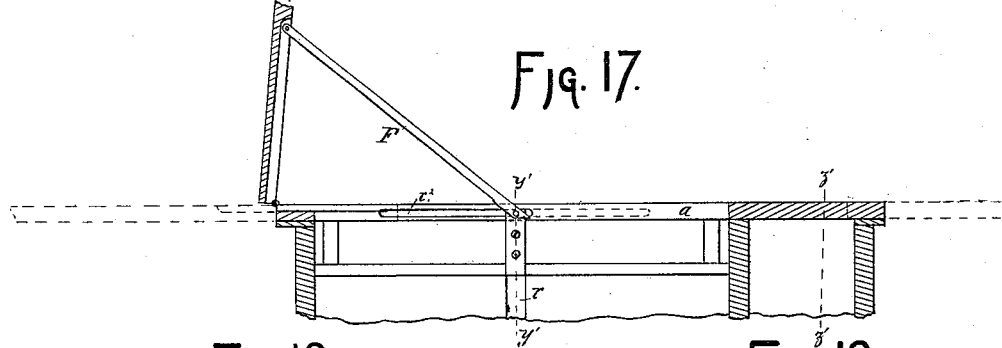
Figure 18:
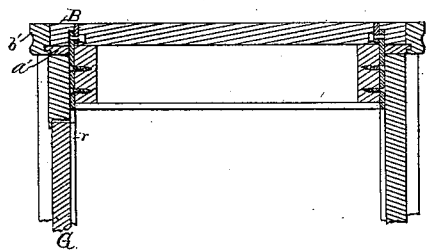
Figure 19:
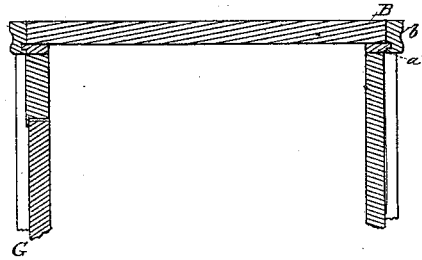

In the accompanying drawings, Figure 1 represents a perspective view of our improved sewing-machine table or three-quarter cabinet with the sewing-machine dropped or lowered; Fig. 2, a perspective view of the sewing-machine table, stand form, with the top open and forming the extension-leaf and the machine in position for use; Fig. 3, a vertical longitudinal section of the table, with the sewing-machine dropped and the top closed, as in Fig. 1; Fig. 4, a longitudinal section of the table with the sewing-machine raised, the solid lines showing the position of the machine and top when the machine is raised until its platform is level with the top of the table, and the broken lines showing the position of the machine and hinged top when the machine is in position for operating; Fig. 5, a vertical transverse section, taken on line $x\ x$, (see Fig. 3,) of the table when closed. Fig. 5$^a$ is a detail sectional view of the platform; Fig. 6, a plan of the table with the hinged top, machine, and sliding platform removed; Fig. 7, a view of the under side of the sliding platform. Figs. 8 and 9 are sectional details of the front of the table below the top, showing the hinged connection and the spring by which the front is thrown up when the machine is raised. Fig. 10 is a sectional detail of the machine-platform and the sub-platform and the devices by which the sliding motion is given to the main platform. Fig. 11 is a longitudinal section of the main and sub platform. Fig. 12 is a plan, partly in section, of one side of the sub-platform; and Fig. 13 is a cross-section taken on line $y\ y$ of Fig. 12, showing another mode of giving the sliding motion to the platform. Fig. 14 is a perspective view of one end of the table, showing a part of the hinged top and a part of the top which is connected with the table separately, and is arranged to form with the table a desk for writing and a receptacle for writing materials. Fig. 14$^a$ is a sectional detail of the device for lifting the desk-top. Fig. 15 is a longitudinal section of the table-top taken on line $z\ z$ of Fig. 1, showing a latch or bolt by which the extension-leaf top and the desk are fastened and simultaneously released. Fig. 16 represents a plan of a table-top with the extension-top raised, in which the sliding platform is dispensed with and the table-top is arranged to slide and carry the machine in line with the driving-wheel. Fig. 17 is a longitudinal vertical section of the same taken on line $x'\ x'$ of Fig. 16. Figs. 18 and 19 are vertical cross-sections of the same, taken, respectively, on lines $y'\ y'$ and $z'\ z'$.

Referring to the drawings, A A are the supports of the table, which in the three-quarter cabinet, Fig. 1, may form cases for drawers, &c., at one end and an inclosure for the driving-wheel and pitman at the other, and in the stand, Fig. 2, may be iron or other kind of legs.

B is the top of the table, which is connected with the supports A. The top B is provided with a recess $a$, which is large enough to admit the platform of the machine when the machine is moved into its operative position, with the band-wheel in line with the driving-wheel below, and also to permit the platform and the machine to move away from the driving-wheel and descend between said wheel and the most distant end of the recess into the inclosure under the table-top and between the driving-wheel and the opposite end of the table or its support. The fixed top does not extend entirely over the support at the end opposite the driving-wheel, but terminates just outside of the side $d$, forming the inside of the support in Fig. 1, and the inside of the drawer-case in Fig. 2, and also forming one end of the inclosure into which the machine drops. This leaves a depressed portion $e$ over the drawer case or support, the front and back of which are closed by parts or pieces $f\ f$, corresponding to the front rail and back of the stand or table. The part $e$ is provided with a lid $e'$, which covers a receptacle $e''$ for papers, &c., and in which is placed a tray for pens, having wells for the inkstands, &c.

A box or half-desk $g$ is hinged to the end of the table so that it can be turned over on the lid $e'$ and form a flush connection with the extension top or cover B$'$, as shown in Figs. 1 to 3, and when turned over so as to be flush with the lid $e'$, as shown by dotted lines, Fig. 3, it forms with the part $e$ a desk for writing and other purposes, as illustrated in Fig. 14. The box or half-desk may be formed with or without a receptacle. In the former case the receptacle should be covered by a hinged lid, forming with the lid $e'$ the surface of the desk.

The top or cover B' is designed to form an extension-leaf when opened. To this end it is hinged to the top of the table adjacent to the needle end of the machine. The hinged connection is such that the top or cover B' can be turned on its axis from a position over the table-top where it forms a cover, as in Fig. 3, to a position where it forms an extension of the table-top, in this position serving as a leaf for the table, as indicated by the dotted lines, Fig. 4. By connecting it in the manner stated it is also convertible into a lever for raising the machine from under the table-top into its operative position above the same, and also as a means of moving it out of its operative position by lowering it below and under the table-top, the force of the lever being transmitted to the platform of the machine by mechanism adjusted to compensate for the difference between the distance the cover traverses from its closed to its open positions, and the distance moved by the machine from under the table above the same. Mechanism for allowing this compensating motion is described further on in the specification.

C is the platform to which the base of the machine is fixed; but the base of the machine may be arranged to serve as the platform, if desired. The platform is of less length than the recess $a$ in the fixed table-top, the difference of length being such as to allow the platform to be moved back in the recess far enough to carry the band-pulley on the arm into line with the driving-wheel, as shown by the dotted lines, Fig. 4, and forward until the band-pulley and hand-wheel, when used, and base and platform are out of line with the driving-wheel, and the driving-wheel end of the inclosure, when used, as shown by the solid lines in Fig. 4. The object of the first movement is to adjust the machine to an operative position, and of the second to place the machine and platform in position for lowering or dropping below the table-top and clearing the drive-wheel and the end of the inclosure.

As an unbroken top is required when the machine is in its operative position, and the shortening of the platform leaves a space between its end and the end of the recess when moved back, a filling-piece is needed for the space so made. This filling-piece may be separate from the platform and placed in and taken out by hand, or it may be connected with the top or platform so as to be automatically removed and placed, and this latter is the preferred mode.

D represents the filling-piece, which in this case is made a part of the platform by hinging it to the front end thereof. The under side of the free end is beveled or chamfered, as shown, and when the machine is in its operative position this chamfered end lies on the correspondingly-beveled recess edge of the end $h$ of the top, as shown in Figs. 2 and 4, forming a flush connection with the surface of the top, as shown in Fig. 2; but when the platform and machine are moved into position to be lowered the piece D turns up at right angles to the platform, as shown in Fig. 3, and parallel to the part $d$, so that it will clear the end of the recess $a$ when the machine is dropped.

The machine and its base or platform C are supported on a platform E, which may be merely a rectangular frame located in the inclosure under the recessed table-top, where it is movable freely up and down under the recess, being held in a horizontal position and controlled in its movements by means of suitable guides and guideways. The machine is designed to pass through the recess when raised or lowered, and also to move within the recess and lengthwise thereof, so that it will pass between the driving-wheel and the end of the recess most distant therefrom.

The base or platform C is designed to enter and fill the recess in the table-top, (either of itself or with its piece D, as the case may be.) The said platform C is in connection with the frame or sub-platform E, that forms part of the mechanism by which the machine is raised, lowered, and moved over and away from the driving-wheel.

The frame or platform E is supported or suspended in the inclosure by mechanism that connects it with the hinged cover, so that when the cover is oscillated through the said mechanism the platform E is alternately raised and lowered, and said platform carries with it the base or platform C, which, when E is raised, is lifted into the recess, thereby moving the machine upward between the driving-wheel and the end of the recess most distant therefrom. To make the machine-platform C enter the recess with certainty and to prevent the machine from becoming displaced, it is desirable that the mechanism that communicates the motion and force of the oscillating cover to the machine shall act as nearly as possible in the direction the machine is moved, and not in a direction that will cause the guides to strain against their ways or the platform against the walls of the inclosure. As the cover when oscillated moves in a semicircular path and the platform in passing from its depressed to its upper position, and vice versa, in a straight path, means are adopted to transmute the curved motion of the cover into the straight motion of the machine, and devices for this purpose will now be described.

The platform E may have its end pieces extended beyond its sides, so as to project under the sides of the recess and in proximity to the front and back of the inclosure, as indicated by dotted lines in Fig. 6. By thus constructing the platform E, when it is raised the end pieces, bearing against the under side of the recessed top, prevent the platform from entering the recess, and also, as the connecting mechanism holds the platform up between the top and the pressure of the connecting mechanism, the platform is held perfectly steady. Furthermore, the top is utilized as a stop for the platform, and through the connecting mechanism as a support for the cover when turned over to form an extension-leaf.

In the end pieces of the frame or platform E are pivoted rollers $i$, which bear against the adjacent walls of the inclosure. The purpose of these rollers is primarily to ease the motion of the base or platform C when raised and lowered; but as the platform C enters the recess in the top and it is intended that it shall form a close flush connection therewith the rollers cannot be placed therein, and are accordingly pivoted to the frame or platform underneath. As the platform C is in connection with the frame or platform E, any jamming of platform C against the walls of the inclosure is prevented by the anti-friction rollers, without, however, connecting the rollers therewith in such a way as to prevent it from entering the recess.

To hold the platform squarely and firmly and guide and steady it when moving, guides $t$ are fixed to the platform and held in guideways $t'$. These guides are extended below the platform E, so as to form a long bearing therefor. These guides are employed for the purpose of holding the platform firmly against swaying or turning in any direction. They steady its motion while being elevated or depressed and hold it so that the machine is retained in its proper position relatively to the top of the table. The platform E on being elevated to its highest point raises the machine through the recess between the driving-wheel and the most remote end of the recess and supports it in that position with the platform C in the recess.

In tables where the machine is designed to be movable on the platform E the connection of the machine-platform therewith is such as to permit the machine and its platform to be moved easily lengthwise for the purpose of carrying the machine toward or from the driving-wheel.

The connection between the platform E and the hinged cover is made by means of the rods F. These rods have one end hinged or pivoted to the extension-top, mortises being made in the top for the pivots and grooves extending to the end of the top and through the end $h$ of the top to the point at which the rods connect with the platform, in which the rods may drop when the machine is raised and lie flush with the top, as shown in Fig. 2. The opposite ends of the rods are pivoted to slides $k\ k$, which are held in rectangular slots made through the side pieces of the platform, the said slides being connected through the slots with retaining-pieces $l\ l$, which bear against the inside of the side pieces and slide freely back and forth.

By connecting the platform with the extension-top by means of the rods the opening or extending of the top to form an extension-leaf to the table is utilized to raise the platform and machine up out of the inclosure, and the sliding connection compensates for the difference between the distance traversed by the cover from its closed to its open and from its open to its closed position and the movement of the platform. This difference is made up by allowing the cover lost motion, during which its function as a lever is suspended.

In those tables in which there is sufficient space above the driving-wheel for the machine to descend over it, and in which consequently a sliding platform and a recess longer than the platform are not needed, the recess and platform may be of the same size, so that the platform may fit closely into the recess. The connecting of the sub-platform with the extension-top results in the sewing-machine being raised to a working position by merely turning the extension-top over from its position on the fixed top to a position in which it forms a continuation or extension of that top, as in Fig. 2. The sliding connection which is given to one of the pivots of the rods is necessary in order that the extension-top may be turned completely over, as when the top passes the perpendicular the distance between the pivots constantly increases as the pivots on the top move in a circular path. In other tables in which there is not space enough over the drive-wheel to allow the machine and its platform to descend directly, or in which the end of the inclosure is in the way of its descent, the machine must be moved out of the way of the driving-wheel and the end of the inclosure to lower it below the table-top.

The machine and its platform may be lowered by hand; but as one of the objects of our invention is to move the same by power, and thus facilitate the adjusting of the machine into its operative position, and the lowering thereof into the receptacle under the table-top, we have connected the machine-platform with a cover that is hinged to the table-top so as to be capable of oscillating from a position on and over the table-top to a position where it forms an extension thereof and a leaf for the table. Mechanism by which these results may be accomplished will now be described.

Referring to Figs. 6 to 10, the retaining-piece $l$ on one side is held in a groove or way formed by the side of the platform and an inner side bar $l'$, and on the under side of the retaining-piece is a rack $m$, which engages a pinion $m'$, held by and on a shaft which is passed through the sides of the groove or way, the pinion turning freely. To the under surface of the main or sliding platform is attached a rack $m''$, which is also engaged by the pinion $m'$. The rack $m$ moves with the slide $k$, with which it is connected, and thence through the rod F with the extension-top; hence when the top is thrown up to about a perpendicular position its first action is to raise the platforms and machine until the main or sliding platform is flush with the table-top, as shown in Fig. 4. As the extension-top moves back in turning on its pivots or hinges the rod F draws the slide, moving it toward the front end of the platform. By this motion the rack $m$ is caused to turn the pinion, and the latter in turn acts on the rack $m''$, attached to the main platform, and the latter is thereby moved backward or toward the drive-wheel in the recess. The adjustment is such that the movement of the extension-top from the position it occupies when the sliding platform is raised into the recess $a$ to the horizontal position indicated by the dotted lines, Fig. 4, where it forms an extension of the fixed top, is sufficient to move the sliding platform through the rack-and-pinion connections backward until the band-wheel is in line with the driving-wheel. The movements of the extension-top and sliding platform are clearly indicated by the dotted lines, Fig. 4. These are the motions which take place when the table is opened and the platform and machine are moved to an operative position. When the table is to be closed, the movements are merely reversed.

A modification of the device for giving the sliding or horizontal motion to the platform is illustrated in Figs. 11, 12, and 13. The racks and pinions are dispensed with. The retaining-piece of the slide is connected at each end with a block $n$ by cords $o\ o$, running over pulleys $p\ p$, connected by adjusting-screws with the ends of the sub-platform. The main or sliding platform is connected with the block $n$ by a screw, as shown. The movement of the slide communicates motion through the cords to the sliding platform. It is requisite that the platform be connected with the sub-platform, so that the mechanism by which it is moved will not lift up and disconnect it. In the modification this connection is made by the block and screw; but in the arrangement first described the connection is made by a right-angular projection $q$, attached to the under side of the platform and running in a groove in the side bar $l'$.

To prevent the slides from being drawn in their guideways until the main platform reaches its position in the recess, projections $x$ on the links are arranged to enter vertical grooves $r\ r$, formed in the front and back of the inclosure. Said grooves communicate with horizontal grooves $r'\ r'$ in the recess edges of the fixed top B, the pivots projecting into grooves $r\ r$. When the top is thrown up, the grooves prevent the pivots and consequently the slides from moving, and the end draft is thus borne by the pivots, which may be mounted with rollers, so as to ease their movement in the grooves. When, however, the main platform reaches the recess, the pivots simultaneously reach the upper ends of grooves $r\ r$, and, entering the horizontal grooves $r'\ r'$, move horizontally, carrying the slide, and the platform is moved as before described.

The sliding movement of the rods necessitates longer slots $u\ u$ between the main or sliding platform and the sides of the recess than are required by the actual length of the rods, in order that the rods may slide from the grooves $r\ r$ toward the end of the recess when the platform is moving back. The spaces thus formed are occupied by self-adjustable filling-pieces F' F', hinged at the ends of the slots, and may be provided with springs of rubber or any kind of spring or weight suitable for the purpose to throw them down automatically when the machine is in its working position; or they may be arranged to fall by their own weight.

The front of the inclosure is formed of a piece G, which is arranged to be moved out of the way of the operator when the machine is in use. As shown in Figs. 5 and 9, this part of the front is hinged under the front rail $f$ in a rabbet and held in place by pintles $w$, passed through the sides of the inclosure and through the edge of the piece G. Around the pintles in mortises made in G are coiled springs Y, one end of the coiled springs being passed up into the rail and the other end down into piece G, as shown clearly in Figs. 8 and 9. The object of the spring (of which there may be one or more) is to throw the front G up into a horizontal position out of the way of the operator, as shown in Fig. 2, when the machine and platform are raised. When the machine is lowered or dropped, the sub-platform, bearing down on the front G, presses it down and out until it is in line with the front rail, when it forms the front of the inclosure. One of the retaining-grooves $r$ is formed partly in the front rail and continued down the swinging front.

Figs. 16 to 19 show another construction of the table-top. In this the sliding platform is dispensed with, and the main platform is of the same length as the recess $a$ and fits closely therein, preferably on a sub-platform constructed substantially the same as the one heretofore described. The sliding motion of the machine to carry the band-wheel in and out of line with the driving-wheel is obtained by making the whole table-top slide. For this purpose the top edges of the table are provided with horizontal tongues $a'$, and the sliding top B has grooves in the sides $b'$, into which the tongues are entered, thereby fastening the sliding top to the permanent top or rails of the table, but allowing the top B to be slid longitudinally to a limited extent to or from the driving-wheel in a similar manner to the sliding platform. The extension-top B' is connected with the sub-platform by rods F F, and the pivots are connected with plates, which are held in the vertical grooves $r$ $r$ in the front and back of the table. There are no horizontal grooves in the edges of the recess, but there are grooves $r''$ $r''$ in the edges of the platform. The extension-top B' is hinged to the end of the top B, and a part G of the front is adapted to be folded, and there are grooves and guides, the same as in the construction heretofore described. The object of this construction is to move the table-top B and with it the main or upper platform and the machine, and thereby avoid making the recess longer than the platform. The operation of this construction is as follows: When the extension-leaf is raised, the motion up to about a perpendicular position raises the platform to the upper position, as heretofore. At this point the pivots held in the grooves $r$ $r$ act through the rods as fulcrums of the extension-leaf, which serves as a lever, and as it descends, its lower hinged end bearing against the end of the top B, the latter is forced to slide lengthwise, carrying with it the upper or machine platform, which is held in the recess. When the extension-top reaches a horizontal position, the top has moved far enough to carry the platform and machine, so that the band-wheel aligns with the driving-wheel. The positions of the top and extension-leaf at the end of the movement are indicated by the dotted lines, Fig. 17. The object of this construction is to do away with the filling-piece at the end of the platform and to simplify the construction of the tables, cabinets, &c. The spaces left between the edges of the platform and the recess beyond the ends of the rods may be filled by pieces similar to those used in the construction first described.

The desk-top $g$ and extension-leaf are fastened by latches H H', both of which are connected with the same spring-rod I, so that both can be released at the same instant. The object of this is to prevent the desk-top $g$ from being strained when the extension-top is lifted. A spring-pin J, placed in the desk-rail or at any other suitable point, presses against the desk-top when closed. When, therefore, the latch-rod is pulled back, the two latches simultaneously release the desk-top and the extension-top, and the spring-pin throws the desk-top up until its lower edge is just above the upper edges of the extension-top, so that when the extension-top is lifted its rear edge passes under the desk-top, and the latter, sliding along the surface of the top, is turned over with the top. These motions of the desk-top and extension-top are indicated by dotted lines, Fig. 4.

We claim—

1. In a table, the combination of a top provided with a recess for a drop-platform, an oscillating cover hinged to said top, a drop-platform that is movable up and down and longitudinally with respect to the said top and the recess therein, a slide that is movable in directions parallel to those of the platform, means by which the motion of the slide is transmitted to the platform, guides for the slide, and connections between the slide and cover, through which when the cover is oscillated the slide receives its motion and transmits the same to the platform, substantially as specified.

2. The combination of a table-top provided with a recess, a cover connected with said top and movable from a position over said top where it covers said recess to a position where it uncovers said recess, a platform which is movable up into and down out of said recess and also longitudinally relatively to the table-top and recess, a slide provided with suitable guides and movable up and down and also longitudinally with respect to the table-top, direct or indirect connections between the said slide and platform, and suitable connections between the said slide and cover, substantially as specified.

3. The combination of a table-top provided with a recess, a driving-wheel hung to one of the end supports of the table under said recess, a cover hinged to the table-top and adapted to be oscillated from a position on the table-top to a position where it forms an extension thereof, a platform carrying a sewing-machine and movable upward and away from the cover to a position in the recess over the driving-wheel and toward the cover and downward out of the recess to a position at the side of the driving-wheel, a slide held in suitable guideways and capable of being moved both up and down and longitudinally with respect to the table-top, means by which the motion of the slide is transmitted to the platform, and suitable connections between the said slide and the hinged cover, substantially as specified.

4. The combination of a table-top provided with a recess for the machine-platform, a driving-wheel hung to one of the end supports of the table, a cover hinged to the table-top at the end opposite the driving-wheel and adapted to be oscillated from a position over the table-top to where it forms an extension thereof, a platform for the sewing-machine, which is movable in and out of the recess and toward and from the driving-wheel, a slide held in suitable ways, means by which the slide carries the platform into and out of the recess, and connections between the cover and slide, substantially as specified.

5. The combination of the table-top B, provided with the recess $a$, the cover B', hinged to the top, the platform C, movable up and down and horizontally with relation to the table-top, the slide $k$, having an up and down and horizontal motion in its guides, means by which the said slide transmits motion to the platform, and suitable connections between the said slides and the cover, the construction being such that when the cover is opened it lifts and moves the slide and the latter lifts and moves the platform over the driving-wheel, substantially as specified.

6. In a table, the combination of a top provided with an opening for a movable platform, an oscillating cover hinged to said top, a platform that is movable up and down and horizontally with respect to said top, a slide that is movable up and down and horizontally, means that connect the slide with the platform, and by which the motions of the slide are communicated to the platform, guides for the slide, and connections between the slide and cover, through which when the cover is oscillated the slide receives up and down and reverse horizontal motions and communicates the same motions to the platform, substantially as described.

7. A sewing-machine table having the following parts in combination, viz: a top provided with a recess, an oscillating cover hinged to the table-top, a machine-platform that is movable horizontally in the said recess and vertically into and out of the same, a supporting-platform hung under the recess, a slide connected with said supporting-platform and having a vertical and horizontal motion, means by which the motion of the slide is communicated to the machine-platform, and connections between the said slide and the oscillating cover, as and for the purpose substantially as specified.

8. In a sewing-machine table, the combination of a table-top provided with a recess, a drop-platform of such dimensions that it can be moved into the said recess and form a flush connection with the sides thereof, and anti-friction rollers pivoted in a frame under said platform in juxtaposition to the sides of the inclosure into which the platform drops, but below the recess into which said platform enters when raised, substantially as specified.

9. The combination of the table-top having a recess therein longer than the main platform, the main platform having an end filling-piece hinged to it, the sub-platform, links or rods connected with the sub-platform, and a hinged top pivotally connected with the links, substantially as specified.

10. In a sewing-machine table or cabinet, the sub-top and hinged top of less length than the table or cabinet, whereby a lower portion $e$ is formed at one end of the table or cabinet, and the part $g$, which when placed on the portion $e$ forms a flush connection with the hinged top, so that when the hinged top is turned over it rests upon the portion $e$, which serves as a support therefor, substantially as specified.

11. In combination with the drop-platform and the fixed ends and back of the inclosure, a movable front hinged to the inclosure, and springs for raising said front automatically when the platform is raised up and holding it in position under the platform, substantially as specified.

12. In combination with the hinged top and spring-actuated half-desk or cover, double latches for the purpose of releasing the top and desk-cover simultaneously, substantially as specified.

WILTON C. DONN.
    WM. M. CUTHBERT.

Witnesses:
 JULIUS REHWOLDT,
 A. B. DODGE.